United States Patent [19]

Farmer

[11] Patent Number: 4,735,392

[45] Date of Patent: Apr. 5, 1988

[54] COLLAPSIBLE SUPPORT PLATFORM

[75] Inventor: Mack N. Farmer, Clarinda, Iowa

[73] Assignee: Lisle Corporation, Clarinda, Iowa

[21] Appl. No.: 8,942

[22] Filed: Jan. 30, 1987

[51] Int. Cl.[4] .............................................. F16M 11/00

[52] U.S. Cl. ................................. 248/439; 248/188.6; 108/133

[58] Field of Search ...................... 248/439, 188.6, 168, 248/170, 188; 108/131-133; 182/152, 155, 153

[56] References Cited

U.S. PATENT DOCUMENTS

| | | | |
|---|---|---|---|
| 310,245 | 1/1885 | Benedict | 108/133 |
| 1,778,124 | 10/1930 | Sauer | 108/132 |
| 2,202,624 | 5/1940 | De Saussure | 108/131 |
| 3,195,680 | 7/1965 | Thornburg et al. | 182/150 X |
| 3,396,928 | 8/1968 | Lay | 248/188.6 |
| 3,635,172 | 1/1972 | De Saussure et al. | 108/132 X |
| 3,874,696 | 4/1975 | Gardner et al. | 248/188.6 X |

*Primary Examiner*—Reinaldo P. Machado
*Assistant Examiner*—Alvin Chin-Shue
*Attorney, Agent, or Firm*—Allegretti, Newitt, Witcoff & McAndrews, Ltd.

[57] ABSTRACT

A collapsible support platform having a table, two collapsible support legs interconnected by a pivot rod, two pivot brackets secured to the table and cooperating with the pivot rod, and a latch spring and latch lever also secured to the table to guide movement of the pivot rod in the brackets.

6 Claims, 2 Drawing Sheets

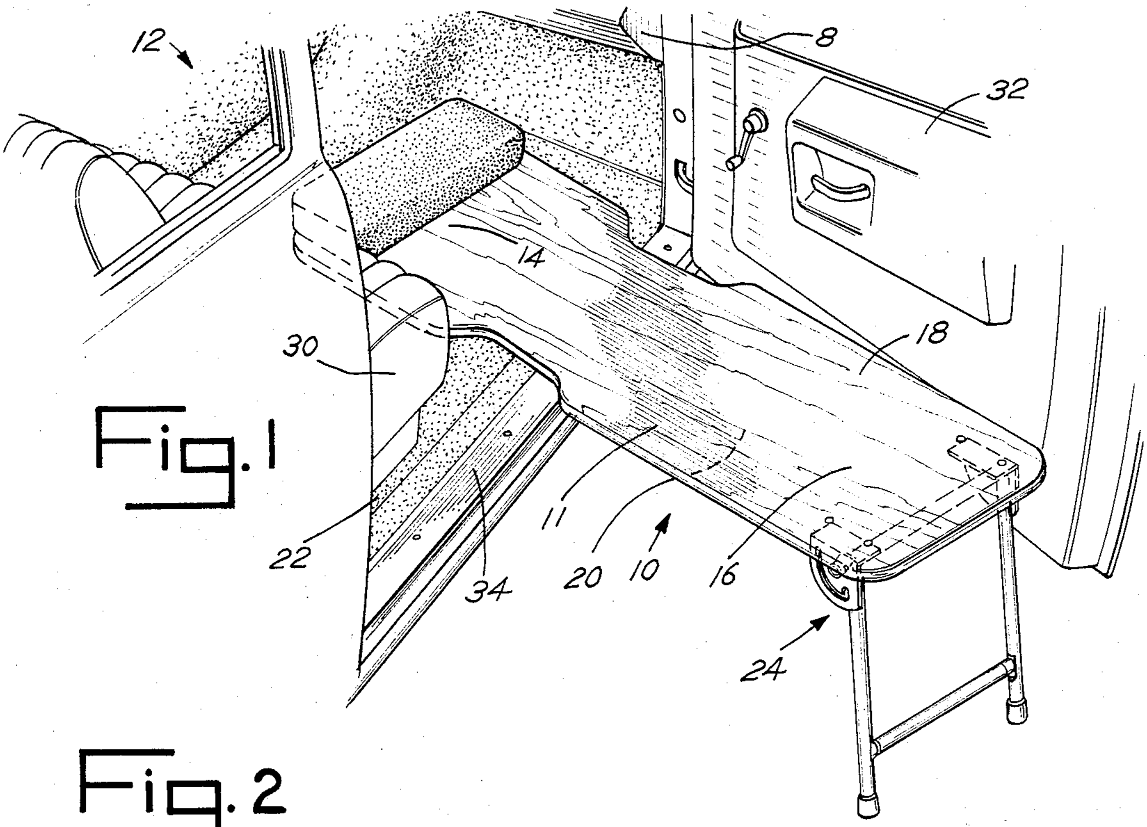
Fig. 1
Fig. 2
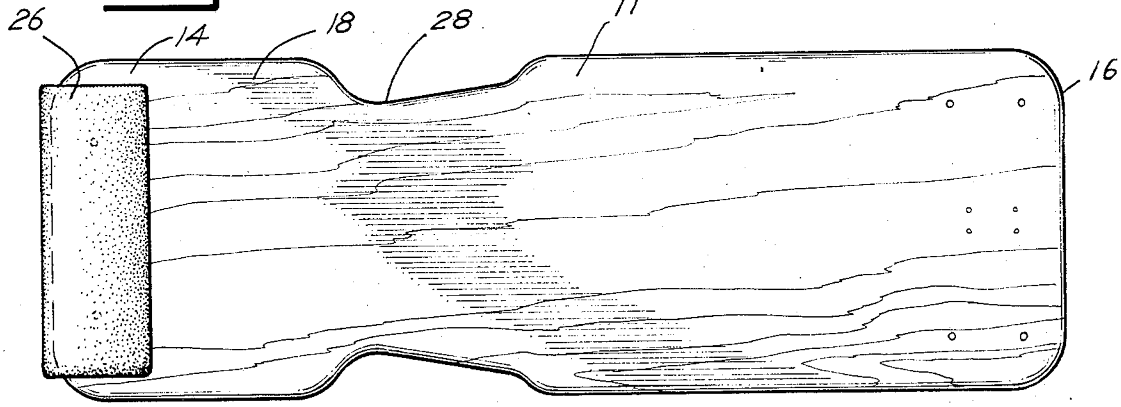
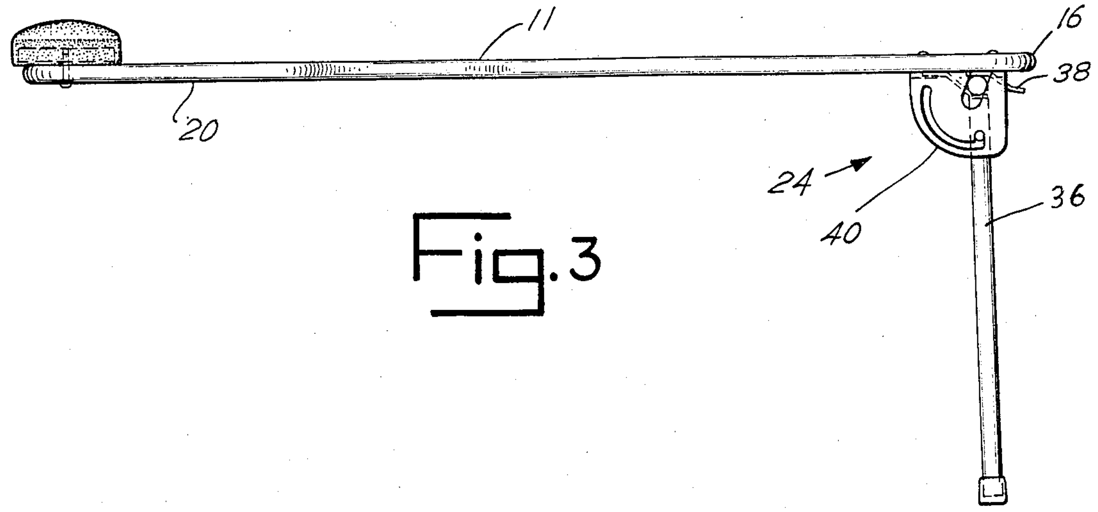
Fig. 3

COLLAPSIBLE SUPPORT PLATFORM

BACKGROUND OF THE INVENTION

This invention relates to a collapsible support platform for use in gaining access to, for example, the underside of the dashboard in a vehicle. More particularly, it relates to a support platform with easily collapsible legs that alternatively and relatively effortlessly lock in the supporting or collapsed state.

In the auto repair art, there have been platforms available for use in working under the dashboard of the auto. These platforms provide support to the repairman as he lays on his back and rests his head under the dash to look and reach upward and thus accomplish tasks from under the dash.

One such platform consists of a rigid board with a free, unsupported end that rests on the floor of the auto. The other end is supported by a single, fixed support leg resting on the ground outside the car doorway. Thus, the operator can lay down on the platform with his head resting on the free end under the dash and his legs resting on the ground outside of the car adjacent the supported end.

This single leg in this particular prior art platform is rigidly secured to the bottom of the platform table and is not collapsible. The rigid protruding leg makes transportation difficult and storage wasteful of space required to accommodate the protruding leg.

The single support leg of this prior art device is also a fairly heavy and bulky T-shaped tubular structure. The weight of this leg also significantly reduces ease of portability of the platform.

It is thus an object of the present invention to develop a more easily portable support platform. Another object to provide such a platform with a leg assembly that is easily collapsible with a single unlocking motion by an operator.

Yet a further object is to provide such a platform that automatically locks in both the collapsed and supporting positions. An additional object is to provide such a collapsible platform with relatively few moving parts and with the moving parts located in an area that reduces the chances of pinching an operator or the operator's clothing.

Another object is to provide a collapsible workman's platform having a necked-down, unsupported end for ease of positioning the unsupported end in a vehicle between a passenger's seat and an open door.

There are other objects and advantages of the present invention. They will become apparent as the specification proceeds.

SUMMARY OF THE INVENTION

The foregoing and other objects and advantages are achieved by my invention of a collapsible support platform having a first end opposite a second end. A collapsible support assembly is secured to the first end for movement between a collapsed and locked position against the platform and a supported and locked position generally transverse to the platform. The support assembly includes at least a pivot rod, a first support leg extending from the pivot rod, and a follower guide penetrating the support leg. A biasing mechanism urges the pivot rod toward the support platform, and a pivot bracket is secured to the platform adjacent the support assembly. The bracket has a rod slot defining a pivot axis for the pivot rod and also has a guide slot for guiding the travel of the follower guide in the support assembly. The guide slot defines an arcuate slot intermediate (i) a locking notch and (ii) a locking slot. The pivot rod rotatably penetrates the rod slot, and the follower guide slidably penetrates the guide slot to guide the motion of the support leg when being moved between the collapsed and locked position and the supported and locked position.

DESCRIPTION OF THE DRAWINGS

In the accompanying drawings, one particular embodiment of the present invention is illustrated wherein:

FIG. 1 is a pictorial view of the support platform arranged in an automobile to work under the dash of the automobile;

FIG. 2 is a top elevational view of the support platform;

FIG. 3 is a side plan view along the rear of the support platform in the supporting state;

DETAILED DESCRIPTION OF THE PREFERRED EMBODIMENT

Figure 4:
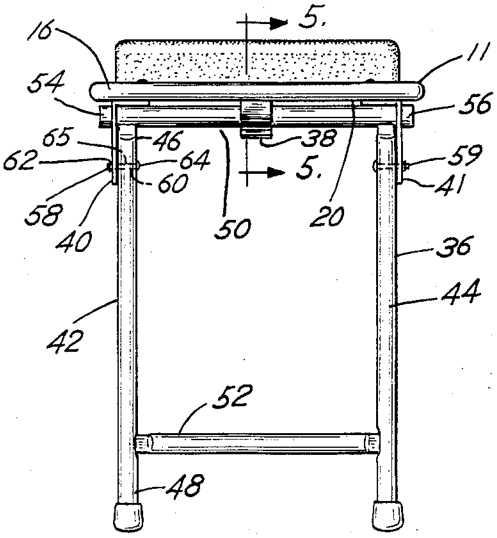
FIG. 4 is a side plan view along the rear of the support platform in the supporting state.

Referring to FIG. 1, the preferred embodiment, generally 10, is used as support platform for working in hard to reach spots, such as under the dashboard 8 of an automobile, generally 12. The preferred embodiment 10 has a support platform 11 with a first, free end 14 opposite a second, supported end 16 and a top side 18 opposite a bottom side 20. The bottom side 20 of the first, free end 14 rests under the dashboard 8 on the floor 22 of the automobile 12. The second end 16 is supported outside of the automobile 12 by means of a support assembly, generally 24.

Referring now to FIG. 2, a padded head rest 26 is secured to the top side 18 of the first end 14 of the platform 11. Between the first end 14 and second ends 16 of the platform 11 is a necked-down portion 28. As shown in FIG. 1, the reduced width of the necked-down portion 28 allows for easier maneuvering of the support platform 11 with respect to the seat 30 and door 32 adjacent the doorway 34 of the automobile 12.

Referring now to FIG. 3, the support assembly 24 includes a leg assembly 36, a biasing assembly 38, and two pivot brackets 40, 41 (41 shown in FIG. 4). The support assembly 24 is secured to the bottom side 20 of the second end 16 of the support platform 11.

With reference next to FIG. 4, the leg assembly 36 consists of two parallel support legs 42, 44. With regard to support leg 42, for example, each support leg 42 has (i) an upper end 46 adjacent the bottom side 20 of the platform and (ii) a lower end 48 spaced from the bottom side 20 when the leg assembly is in the support position as shown in FIG. 4. The two support legs 42, 44 are interconnected by a transverse pivot rod 50 at the upper end 46 and a transverse supporting brace 52 adjacent to but spaced from the lower end 48 of the legs 42, 44. The first end 54 of the pivot rod 50 penetrates the first pivot bracket 40, and the second end 56 of the rod penetrates the second pivot bracket 41. The pivot rod 50 thus rotatably secures the upper end 46 of each leg 42, 44 adjacent the bottom side 20 of the second end 16 of the support platform 11.

The leg assembly 36 includes a follower guide 58, 59 penetrating each leg 42, 44 (respectively). The construction and function of each guide 58, 59 is identical, one for one leg 42 and the other for the other leg 44. With respect to the first leg 42, for example, the follower guide 58 penetrates a follower passage 60 in leg 42 spaced from the junction of the pivot rod 50 with leg 42. The follower guide 58 is somewhat longer in length than the diametral width of the leg 42. Lock nuts 62, 64 are secured at the opposing ends of the follower guide 58, and the shank 65 of the follower guide 58 between lock nuts 62, 64 slidably penetrates the pivot bracket 40. Thus, the first lock nut 62 of the guide 58 abuts the side of the first pivot bracket 40 opposite the first leg 42, and the second lock nut 64 of the guide 58 abuts the side of the first leg 42 opposite the first pivot bracket 40.

The biasing assembly 38 is secured to the bottom side 20 of the support platform 11 intermediate the first leg 42 and second leg 44. This positioning of the biasing assembly 38 places a centered bias on the pivot rod 50 to simultaneously bias the first end 54 and second end 56 of the pivot rod 50 toward the bottom side 20 of the platform 11.

Still referring to FIG. 4, the function of each pivot bracket 40, 41 is identical, pivot bracket 40 being cooperative with leg 42 and pivot bracket 41 being cooperative with leg 44. For example, with reference now to FIG. 5, pivot bracket 40 is secured to the bottom side 20 of the support platform 11. The first end 54 of the pivot rod 50 penetrates a rod slot 66 in the bracket 40, and the shank 65 of the follower guide 58 penetrates guide slot 68 in the bracket 40. The rod slot 66 extends downwardly from, and at an acute angle to, the bottom side 20 of the platform 11 in the direction of the guide slot 68.

The guide slot 68 defines:

(i) an arcuate travel slot 70 of constant radius R1 at a fixed center x in the rod slot 66 spaced from the bottom side 20 of the platform 11;

(ii) a locking notch 72 extending along radius R2 at the end of the arcuate slot 70 furthest from the bottom side 20 of the platform 11; and (iii) a locking slot 74 at the end of the arcuate slot 70 nearest the bottom side 11. The locking slot 74 also has a constant radius R3 equivalent in radial length to the radial length of radius R2. However, the center of radius A is not fixed but is centered along a line B in the rod slot 66 between the fixed center X of Radius R1 and the bottom side 20 of the platform 11.

Figure 6:
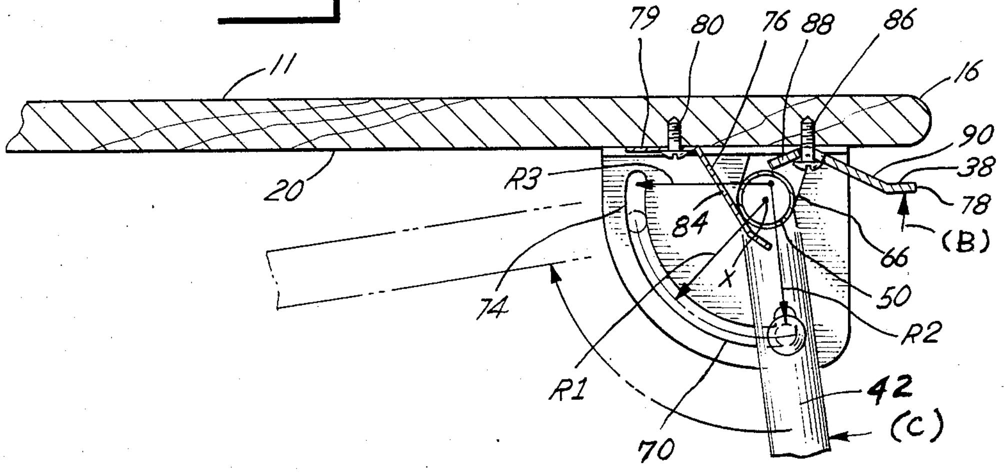
FIG. 6 is a sectional view of the support platform taken along section line 5—5 of FIG. 4 when the support platform is in the unlocked, collapsing state.

Referring to FIG. 6, the biasing assembly 38 consists of a latch spring 76 and a latch lever 78. The latch spring 76 has a secured end 79 secured to the bottom side 20 of the platform by means of a first screw fastener 80.

The latch spring 76 has an angled spring portion 84 extending at an obtuse angle from the secured end 79 of the latch spring 76. The spring portion 84 abuts the periphery of the pivot rod 50 on the side of the rod opposite the bottom side 20 of the platform 11, to urge the pivot rod 50 simultaneously toward the bottom side 20 and first end 16 of the platform 11 in the rod slot 66.

The latch lever 78 is secured to the bottom side 20 of the platform by means of a second screw 86. The lever 78 has a pivoting end 88 and a lever arm 90 extending at an obtuse angle from the pivoting end 88, and the second screw 86 penetrates the lever 78 at the junction of the pivoting end 88 and lever arm 90. The pivoting end 88 extends between the bottom side 20 of the platform 11 and the periphery of the pivot rod 50 adjacent the bottom side 20. The lever arm 90 thus extends downwardly from the platform's bottom side 20 on the side of the pivot rod 50 opposite the latch spring 76.

Still referring to FIG. 6, the distance between the axial center of the pivot rod 50 and the axial center of the follower guide 58 is identical to the length of the radius R1 of the guide slot 68. In addition, the length of R1 is, of course, equal to the length of R2 and of R3.

Figure 5:
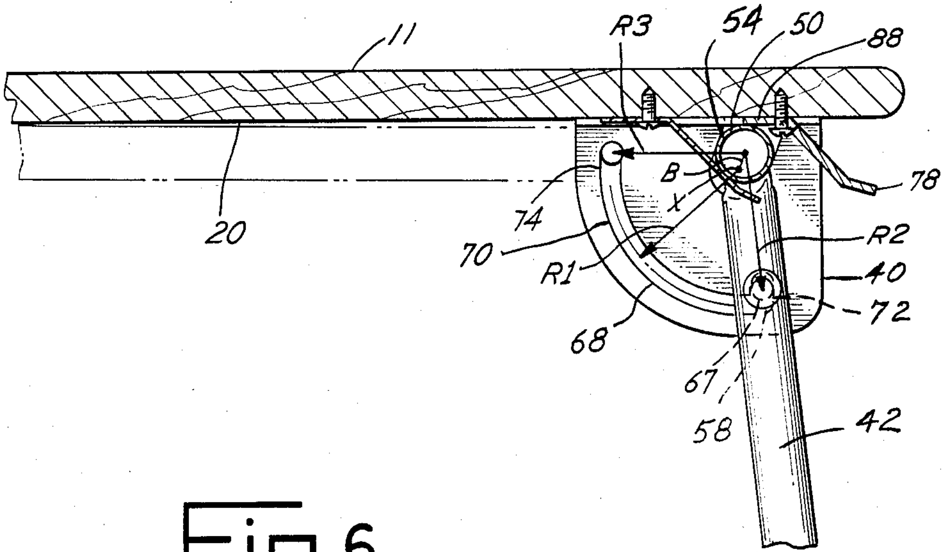
FIG. 5 is a sectional view of the support platform taken along section line 5—5 of FIG. 4 when the support platform is in the locked supported state.

Thus, when the follower guide 58 is in the locking notch 72 and the pivoting end 88 of the latch lever 78 abuts the bottom side 20 of the platform 11 as shown in FIG. 5, the spring portion 84 of the latch spring 76 biases the pivot rod 50 upward in the rod slot 66 to abut the side of the pivoting end 88 opposite the bottom side 20 of the platform 11. In this position, the follower guide 58 is positioned in the upper portion of the locking notch 74 nearest the bottom side 20 of the platform 11. The locking notch 72 thus restrains the follower guide 58, and thus the support leg 42 to which the follower guide 58 is secured, from rotation in the guide slot 68. The locking notch 72 thereby serves to lock the support leg 42 in a support position.

As shown in FIG. 6, the latch lever 78 is partially rotatable about the second screw 84. Manual pressure (see arrow B) on the lever arm 90 of latch lever 78 in the direction of the bottom side 20 of the platform 11 forces the latch lever 78 to pivot against the bottom side 20 and the pivoting end 88 at latch lever 78 to rotate away from the bottom side 20 of the platform 11. Rotation of the pivoting end 88 away from the bottom side 20 forces the pivot rod 50 to move downwardly away from the bottom side 20 in the rod slot 66. Movement of the pivot rod 50 downwardly forces the follower guide 58 to move downwardly in the locking notch 72 to abut the arcuate travel slot 70. As thus positioned, manual pressure (see arrow C) on the first leg 42 simultaneously forces: (i) the follower guide 58 to move upwardly in the arcuate slot 70 along radius R1, (ii) the pivot rod 50 to rotate in the rod slot 66 about the fixed center X; and (iii) the supporting leg 42 to collapse toward the bottom side 20 of the platform 11. As continued manual pressure on the first leg 42 forces the follower guide 58 out the arcuate slot 70 and into the adjacent locking slot 74, the pivot rod 50 is forced to move upwardly in the rod slot 66. The upward biasing force of the latch spring 76 forces the pivot rod 50 to move to the top of the rod slot 66 and adjacent the bottom side 20 of the platform 11. Simultaneously, the movement of the pivot rod 50 upwardly in the rod slot 66 forces the follower guide 58 to move upwardly in the locking slot 74. As the pivot rod 50 reaches the top of the rod slot 66 adjacent the bottom side 20 of the platform, the follower guide 58 is forced to the top of the locking slot 74 nearest the bottom side 20 of the platform 11. In this position, the follower guide 58 retains leg 42 in a collapsed state adjacent the bottom side 20 of the platform 11 since (1) the force of the latch spring 76 biases the pivot rod 50 adjacent the bottom side 20 of the platform 11 and (2) in this position, the follower guide 58 cannot move downwardly in the guide slot 68.

The leg 42 is moved from the collapsed and locked position (shown in phantom in FIG. 5) to the supported and locked position of FIG. 5 by applying identical manual force against the latch lever 78 and the exact opposite manual force against the leg 42. This operation forces leg 42 into the supported and locked position in which (i) the latch spring 76 again biases the pivot rod 50 adjacent the bottom side 20 of the platform and (ii) the follower guide 58 is restrained by the locking notch 72 from horizontal movement. Vertical movement in the locking notch 72 and the guide slot 66 is restrained by the latch spring 76 and the weight of the mechanic using the platform.

Since, as shown in FIG. 4, the biasing assembly 38 is located intermediate the first 42 and second 44 support legs, the force of the latch lever 78 and latch spring 76 is against the center of the pivot rod 50. Since the first 40 and second 41 pivot brackets maintain the legs 42, 44 in parallel alignment perpendicular to the bottom side 20 of the platform, movement of the pivot rod 50 by the biasing assembly 38 translates into simultaneously and identical movement of both legs 42, 44 vis a vis their respective pivot brackets 40, 41.

It can thus be seen that the preferred embodiment provides a simple, economical, and secure collapsible workman's platform that automatically locks in both the collapsed and supporting positions. The platform has relatively few moving parts, and the moving parts that exist are located under the seat and spaced from the edge to reduce the chance of pinching a workman or a workman's clothing. The platform also has a necked-down portion for ease of positioning and moving the platform in the doorway of the automobile.

The foregoing is merely a detailed description of the particular preferred embodiment of the present invention. It should be understood that this description is illustrative, not exclusive, and that the scope of my invention is instead indicated by the following claims in view of the preceding description.

What is claimed is:

1. A collapsible support platform comprising in combination:

(a) a support platform having a first platform end and second platform end;

(b) a leg assembly pivotally attached to the first platform end for movement between a locked platform support position, generally transverse to the platform, and a locked collapsed position, the leg assembly including a rotatable pivot rod, at least a first support leg extending from the rotatable pivot rod, and a follower guide penetrating the support leg at a predetermined distance from the pivot rod;

(c) biasing means for urging the pivot rod toward the support platform when the leg assembly is in the support position or collapsed position, a latch lever having a first latch end opposite a second latch end and an angled portion intermediate the first and second latch ends, the first latch end adjacent the support platform on one side and abutting the pivot rod on the opposite side, and the angled portion being pivotally secured to the support platform so that, by applying pressure to the second latch end of the latch lever, the first latch end urges the pivot rod away from the support platform against the biasing means to force the pivot rod to slide in the rod slot away from the support platform; and (d) at least one pivot bracket secured to the support platform, the bracket including (i) a rod slot defining a pivot axis for the pivot rod and (ii) a guide slot defining (a) a locking notch parallel to and coincident with the platform supporting position of the support leg, (b) a locking slot having a radius of constant length but non-fixed center slidably centered in the rod slot, and (c) an arcuate travel slot intermediate the locking notch and arcuate locking slot, the travel slot having a radius of constant length and fixed center centered in the rod slot, the pivot rod rotatably penetrating the rod slot, and the follower guide slidably penetrating the guide slot.

2. An improved collapsible support platform comprising in combination:

(a) a support platform having a first and a second platform end;

(b) a leg assembly pivotally attached to the first platform end for movement between a locked platform support position, generally transverse to the support platform, and a locked collapsed position, the leg assembly including a rotatable pivot rod having a first rod end opposite a second rod and, a first and a second leg secured at the opposite rod ends of the pivot rod, and a first and a second follower guide penetrating the first and second support legs, respectively, at a predetermined distance from the pivot rod;

(c) biasing means for urging the pivot rod toward the support platform, a latch lever having a first latch end opposite a second latch end and an angled portion intermediate the first and second latch ends, the first latch end adjacent the support platform on one side and abutting the pivot rod on the opposite side, and the angled portion being pivotally secured to the support platform so that, by applying pressure to the second latch end of the latch lever, the first latch end urges the pivot rod away from the support platform against the biasing means to force the pivot rod to slide in the rod slot away from the support platform;

(d) a first and a second pivot bracket secured to the first platform end adjacent the first and second legs, respectively, each pivot bracket including (i) a rod slot defining a pivot axis and (ii) an arcuate guide slot defining (a) a locking notch parallel to and coincident with the platform supporting position of the support leg, (b) a locking slot having a radius of constant length but non-fixed center slidably centered in the rod slot, and (c) an arcuate travel slot intermediate the locking notch and arcuate locking slot, the travel slot having a radius of constant length and fixed center centered in the rod slot, the pivot rod rotatably penetrating the rod slot, and the follower guide slidably penetrating the guide slot.

3. The improved collapsible support platform of claim 1 or 2 wherein the biasing means includes a latch spring with one spring end secured to the support platform and the opposite spring end engaging the pivot rod to urge the rod toward the support platform.

4. The improved collapsible support platform of claim 3 wherein the platform has a free platform end opposite a supported platform end and a narrowed portion intermediate the free and supported platform ends, and wherein the leg assembly, urging means, and pivot brackets are mounted on the supported platform end.

5. The improved collapsible support platform of claim 2 wherein the biasing means is centered between the first and second legs and includes a latch spring with one spring end secured to the support platform and the opposite spring end engaging the pivot rod to simultaneously urge the first and second ends of the pivot rod toward the support platform.

6. The improved collapsible support platform of claim 5 wherein the platform has a free platform end opposite a supported platform end and a narrowed portion intermediate the free and supported platform ends, and wherein the leg assembly, urging means, and pivot brackets are mounted on the supported platform end.

* * * * *